United States Patent
Inselmann

(10) Patent No.: US 8,350,178 B2
(45) Date of Patent: Jan. 8, 2013

(54) METHOD OF WELDING DUPLEX STAINLESS STEEL STRIP FOR THE PRODUCTION OF AN ARMOURING LAYER OF A FLEXIBLE PIPE

(75) Inventor: Steen Inselmann, Naestved (DK)

(73) Assignee: National Oilwell Varco Denmark I/S, Brondby (DK)

( * ) Notice: Subject to any disclaimer, the term of this patent is extended or adjusted under 35 U.S.C. 154(b) by 688 days.

(21) Appl. No.: 12/532,732

(22) PCT Filed: Mar. 14, 2008

(86) PCT No.: PCT/DK2008/050065
§ 371 (c)(1),
(2), (4) Date: Sep. 23, 2009

(87) PCT Pub. No.: WO2008/116469
PCT Pub. Date: Oct. 2, 2008

(65) Prior Publication Data
US 2010/0059488 A1 Mar. 11, 2010

(30) Foreign Application Priority Data
Mar. 23, 2007 (DK) .................................. 2007 00451

(51) Int. Cl.
*B23K 9/00* (2006.01)
(52) U.S. Cl. ........ 219/100; 219/101; 219/103; 219/104; 219/121.64
(58) Field of Classification Search ................. 219/60.2, 219/61, 79, 101, 103, 104, 121.64, 137 R, 219/137 WM, 146.23
See application file for complete search history.

(56) References Cited

U.S. PATENT DOCUMENTS

| 4,178,022 A | * | 12/1979 | Hanneman | 285/288.1 |
| 4,376,242 A | | 3/1983 | Buff et al. | |
| 4,506,134 A | | 3/1985 | Ichikawa et al. | |

(Continued)

FOREIGN PATENT DOCUMENTS
DE 19539790 A1 4/1997
(Continued)

OTHER PUBLICATIONS

International Search Report for PCT/DK2008/050065 date Jun. 25, 2008.

(Continued)

*Primary Examiner* — Michael Lebentritt
(74) *Attorney, Agent, or Firm* — Pearne & Gordon LLP

(57) ABSTRACT

The invention relates to a method of providing a duplex stainless steel strip for an armouring layer of a flexible pipe, said method comprising
  providing at least two duplex stainless steel pieces each having an end-face,
  welding said end-faces of said two pieces of duplex stainless steel together to form a welded interface section using resistance welding, such as dual upset welding or flash welding, and
  providing a controlled cooling of said welded interface section.
The duplex stainless steel strip should preferably be heated to a temperature of at least about 1100° C., preferably at least about 1200° C., such as at least about 1500° C. in said interface section, and the controlled cooling of said welded interface section preferably comprises prolonging the cooling of the interface section preferably at least for the cooling from about 800° C. to about 600° C., more preferably at least for the cooling from about 1100° C. to about 600° C.

19 Claims, 1 Drawing Sheet

U.S. PATENT DOCUMENTS

| | | | |
|---|---|---|---|
| 4,549,581 A | | 10/1985 | Unno et al. |
| 4,878,955 A | * | 11/1989 | Hoshino et al. ............... 148/610 |
| 5,178,687 A | * | 1/1993 | Miyakusu et al. ............. 148/325 |
| 5,275,209 A | | 1/1994 | Sugier et al. |
| 5,440,090 A | * | 8/1995 | Davis et al. ...................... 219/61 |
| 5,730,188 A | | 3/1998 | Kalman et al. |
| 5,813,439 A | | 9/1998 | Herrero et al. |
| 5,849,116 A | * | 12/1998 | Miyasaka et al. ............. 148/592 |
| 6,065,501 A | | 5/2000 | Feret et al. |
| 6,085,799 A | | 7/2000 | Kodaissi et al. |
| 6,123,114 A | | 9/2000 | Seguin et al. |
| 6,192,941 B1 | | 2/2001 | Mallen-Herrero et al. |
| 6,253,793 B1 | | 7/2001 | Dupoiron et al. |
| 6,283,161 B1 | | 9/2001 | Feret et al. |
| 6,340,396 B1 | * | 1/2002 | Ogawa et al. .................... 148/23 |
| 6,354,333 B1 | | 3/2002 | Dupoiron et al. |
| 6,379,821 B2 | * | 4/2002 | Kushida et al. ................ 428/685 |
| 6,415,825 B1 | | 7/2002 | Dupoiron et al. |
| 6,668,867 B2 | | 12/2003 | Espinasse et al. |
| 6,691,743 B2 | | 2/2004 | Espinasse |
| 6,840,286 B2 | | 1/2005 | Espinasse et al. |
| 6,875,948 B2 | * | 4/2005 | Gobez et al. ................... 219/100 |
| 6,889,717 B2 | | 5/2005 | Coutarel et al. |
| 7,032,623 B2 | | 4/2006 | Averbuch et al. |
| 7,150,328 B2 | * | 12/2006 | Marketz et al. ............... 166/380 |
| 7,225,868 B2 | * | 6/2007 | Arai et al. ...................... 166/277 |
| 7,874,471 B2 | * | 1/2011 | Fairchild et al. ............ 228/112.1 |
| 2001/0030004 A1 | * | 10/2001 | Kushida et al. ............... 148/325 |
| 2004/0055657 A1 | | 3/2004 | Espinasse et al. |
| 2004/0154677 A1 | | 8/2004 | Coutarel et al. |
| 2005/0156010 A1 | * | 7/2005 | Flak et al. ................... 228/112.1 |
| 2010/0136369 A1 | * | 6/2010 | Ayer et al. ..................... 428/683 |
| 2010/0159265 A1 | * | 6/2010 | Fairchild et al. .............. 428/586 |

FOREIGN PATENT DOCUMENTS

| | | |
|---|---|---|
| EP | 0260233 A1 | 3/1988 |
| EP | 1342529 A2 | 9/2003 |
| EP | 1484129 A1 | 12/2004 |
| GB | 688244 | 3/1953 |
| WO | 0036324 A1 | 6/2000 |
| WO | 0161232 A1 | 8/2001 |
| WO | 0181809 A1 | 11/2001 |
| WO | 2006097112 A2 | 9/2006 |

OTHER PUBLICATIONS

Denmark Search Report for PA 2007 00451 dated Nov. 5, 2007.

Kuroda et al, "Flash Butt Resistance Welding for Duplex Stainless Steels," Vacuum, Pergamon Press, GB, vol. 80, No. 11-12, Sep. 7, 2006, pp. 1331-1335, XP005612910.

Kawasaki et al, "Corrosion Resistance of the Girth weld HAZ of Duplex Stainless Steel," Proceedings of the Eighth International Conference on Offshore Mechanics and Artic Engineering, vol. 3, Jan. 1, 1989, pp. 207-212, XP009101428.

Nowacki, "Duplex-steel Welding Problems in the Building of Chemical Cargo Ships," Welding International, Woodhead Publishing, CA, vol. 18, No. 7, Jul. 1, 2004, pp. 509-515, XP019384997.

\* cited by examiner

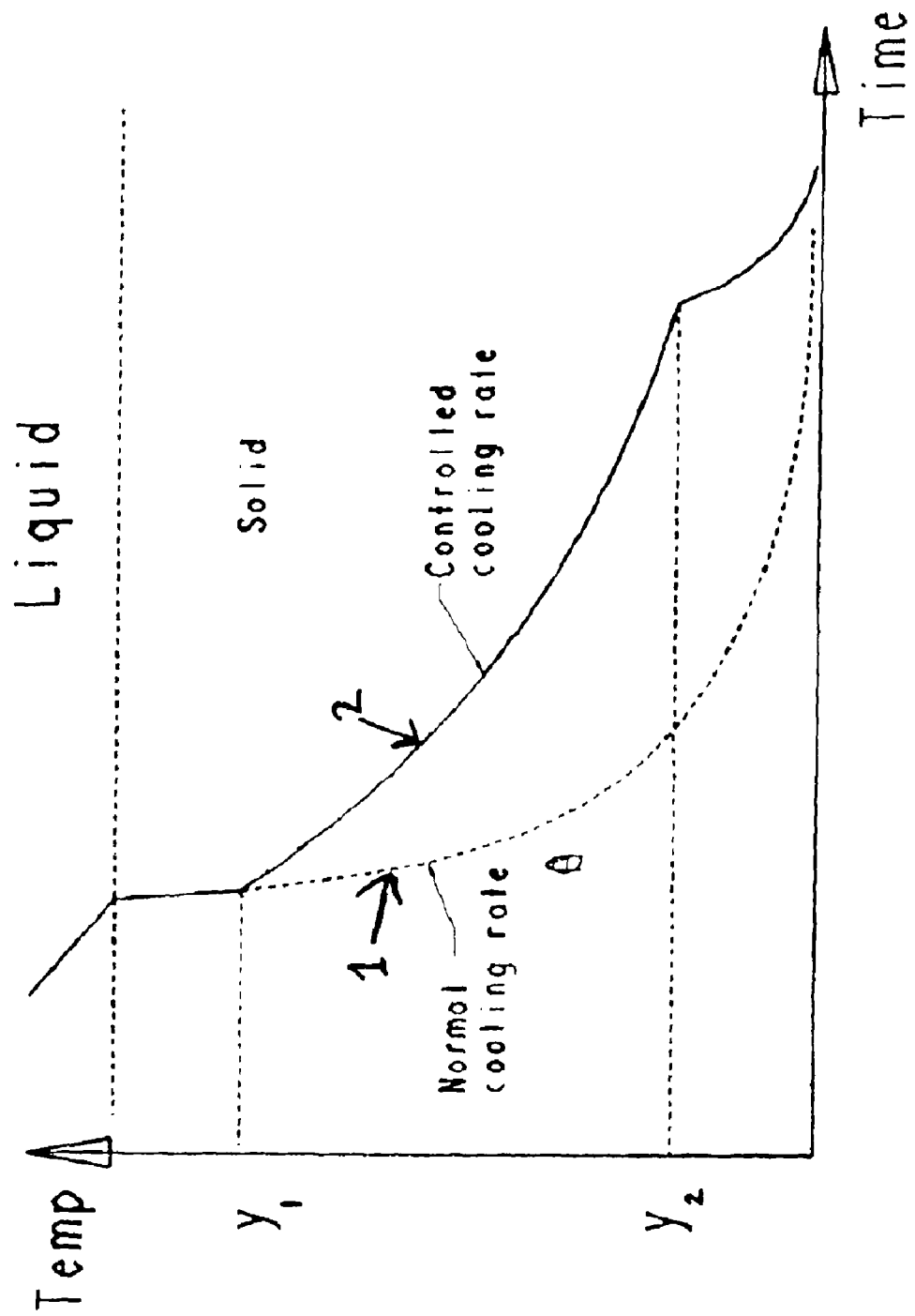

Method of Welding Duplex Stainless Steel Strip for the Production of an Armouring Layer of a Flexible Pipe

TECHNICAL FIELD

The present invention relates to the production of a strip for an armouring layer of a flexible pipe. The invention in particular relates to the production of a duplex stainless steel strip.

BACKGROUND ART

Flexible pipes for offshore transportation are well known in the art. Such pipes comprise an inner liner which forms a barrier against the outflow of the fluid which is conveyed through the pipe, and one or more armouring layers on the outer side of the inner liner (outer armouring layer(s)). The flexible pipe may comprise additional layers such as one or more inner armour layers to prevent the collapse of the inner liner. Such inner armouring layer or layers are normally referred to as a carcass. An outer sheath may be provided with the object of forming a barrier against the ingress of fluids from the pipe surroundings to the armour layers.

Typical unbonded flexible pipes are e.g. disclosed in WO0161232A1, U.S. Pat. No. 6,123,114 and U.S. Pat. No. 6,085,799.

The term "unbonded" means in this text that at least two of the layers including the armouring layers and polymer layers are not bonded to each other. In practice the pipe will comprise at least two armouring layers, which are not bonded to each other directly or indirectly via other layers along the pipe. Thereby the pipe becomes bendable and sufficiently flexible to roll up for transportation.

The above-mentioned type of flexible pipes is used, among other things, for off shore as well as some on-shore applications for the transport of fluids and gases. Flexible pipes can e.g. be used for the transportation of fluids where very high or varying water pressures exist along the longitudinal axis of the pipe, such as riser pipes which extend from the seabed up to an installation on or near the surface of the sea, pipes for transportation of liquid and gases between installations, pipes which are located at great depths on the seabed, or between installations near the surface of the sea.

In traditional flexible pipes, the one or more outer armouring layers are most often in the form of helically wound steel strips in the form of wires e.g. shaped as profiles, where the individual layers may be wound with different winding angles relative to the pipe axis. The carcass is typically made from wound stainless steel strips.

A pipe of the above type needs to fulfil a number of requirements. First of all the pipe should have high mechanical strength to withstand the enormous forces it will be subjected to during transportation, laying down and in operation. The internal pressure (from inside of the pipe and outwards) and the external pressure (from outside of the pipe) are very high and may vary considerably. Simultaneously the flexible pipe should be very resistant to corrosive fluids. Furthermore, it is important that the weight is kept sufficiently low as a too high weight may rupture the pipe during laying out and further the more weight, the more expensive the transportation.

In general such pipes are expected to have a lifetime of about 20 years in operation.

For obtaining a high strain, high corrosion resistant flexible pipe at least one of the armouring layers, such as the carcass is made from duplex stainless steel.

Duplex stainless steel is a steel consisting essentially of a mixed microstructure of austenite and ferrite most often in an about 50:50 volume % mix, and preferably mix may be about 40:60 to about 60:40 volume % mix of austenite and ferrite. During the production and use of such Duplex stainless steel formation of martensite from the austenite should preferably be avoided, because this may lead to an undesired increase in brittleness and/or a reduced corrosion resistance.

The flexible pipes are normally produced in relatively long lengths such as about 50 m or more, such as about 500 m or more or even in lengths of up to 2 or 3 kilometres or even more. Due to the long length it is necessary to weld sections of duplex stainless steel strips together. Such weldings are usually performed by flash welding. However it has been found that this welding does not provide a sufficiently string and reliable structure.

DISCLOSURE OF THE INVENTION

The object of the invention is to provide an improved method of providing a duplex stainless steel strip for an armouring layer of a flexible pipe.

This object has been achieved by the invention as it is described below and defined in the claims.

Embodiments of the invention provide additional beneficial effects as it will be clear from the following description.

The method of providing a duplex stainless steel strip for an armouring layer of a flexible pipe, said method comprising
  providing at least two duplex stainless steel pieces each having an end-face,
  welding said end-faces of said two pieces of duplex stainless steel together to form a welded interface section using resistance welding, and
  providing a controlled cooling of said welded interface section.

The duplex stainless steel pieces are normally oblong elements which may preferably have a substantially identical cross-sectional profile along their length. Preferably the duplex stainless steel pieces have the cross sectional profile as they should have in use when wound to form the armouring layer or layers of the flexible pipe.

The duplex stainless steel pieces may preferably be welded to each other in an end-to-end configuration, preferably providing a duplex stainless steel strip having a cross-sectional profile which is substantially uniform along its length.

The end faces to be welded should preferably correspond to each other to be in close contact when abutted to each other prior to performing the welding. In one embodiment the end faces to be welded are essentially plane prior to the welding.

The steel strip products in the form of the duplex stainless steel pieces may be provided using any method such as the method known according to prior art. The duplex stainless steel pieces may for example be manufactured from steel slabs known as billets. A billet is heated and hot-rolled to produce relatively thick strips of steel which are subsequently further processed to have the desired cross sectional profile. The length of strips (duplex stainless steel pieces) provided this way are there after welded according to the invention.

In one embodiment the two or more duplex stainless steel pieces are welded to each other prior to producing the armouring layer of the flexible pipe. In an alternative embodiment the duplex stainless steel pieces are welded in-line in the production of the pipe as described below. In one embodiment the number of duplex stainless steel pieces welded in length configuration to form one long strip may in principle be any number, and depend mainly on the length of the duplex stainless steel pieces prior to welding and the desired length of the flexible pipe and thereby the armouring layer thereof.

The resistance welding in combination with the controlled cooling of the welded interface section of the duplex stainless steel strip has been found to provide a very strong and reliable weld in a very fast and simple way, even for duplex stainless steel alloys which previously have not been possible to weld with the desired weld structure. Furthermore the duplex stainless steel essentially maintains its microstructure of austenite and ferrite in the welded interface and thereby the material in the welded section comprising this interface maintains its high strength, low brittleness and high corrosion resistance.

As mentioned in the introduction a requirement to flexible pipes is that they have a long life time, such as about 20 year. Weaknesses due to weak weldings are therefore not acceptable.

For many applications, e.g. when the flexible pipe is to be used in acidic environments e.g. for transporting aggressive gasses such as $H_2S$, the requirement put on the armouring layer(s) and in particular a possible carcass and the material they are made of, is very high.

For duplex stainless steel the invention has shown to provide unexpected benefits with respect to weld structure equal or better than possible with normal welding methods. This welding process is much faster and much better reproducible that all other processes.

The duplex stainless steel pieces of at least end sections comprising the end faces of the duplex stainless steel pieces may in one embodiment be preheated prior to performing the resistance welding. The duplex stainless steel pieces of at least end sections comprising the end faces of the duplex stainless steel pieces may in one embodiment be preheated to about 100° C. or more, such as to about 200° C. or more, such as to about 300° C. or more, such as to about 400° C. or more, such as to about 500° C. or more prior to performing the resistance welding. The heat applied prior to the resistance welding may be applied using any heat source and heating method.

In one embodiment the resistance welding is a dual upset welding. This is a welding process that combines heating up the material and pressing it together.

In one embodiment the dual upset welding is a resistance welding process which produces coalescence simultaneously over the entire area of abutting end-faces or progressively along the welding, by the heat obtained from resistance to electric current through the area where those end-faces are in contact.

Pressure may be applied before heating is started and it may be maintained throughout the heating period. The difference from the flash welding described below is that the parts are clamped in the welding machine and force is applied bringing them tightly together. High-amperage current is then passed through the joint, which heats the abutting surfaces. When they have been heated to a suitable forging temperature an upsetting force is applied and the current is stopped or reduced according to the invention. The high temperature of the work at the abutting surfaces plus the high pressure causes coalescence to take place.

The method may for example be performed as follows: In the first step the two duplex stainless steel piece ends are pressed together. When contact is obtained a predefined current is used for heating up the material. When there is full contact between the two duplex stainless steel pieces, the pressure is raised. After the duplex stainless steel pieces have traveled a certain fixed, distance sensors may activate the next step in the welding process. This is the upsetting cycle under higher pressure. After the duplex stainless steel pieces have traveled a certain fixed distance, sensors may switch off welding current and welding pressure.

In one embodiment the dual upset welding comprises
bringing said two end faces in contact with each other
heating at least a section of said two duplex stainless steel pieces by applying a current, the heated sections comprising said end-faces, and
pressing said end-faces against each other.

The two end faces may be brought in contact prior to applying the current or after having initiated the current.

In one embodiment the application of current and the pressing of the end-faces against each other are performed at least partly overlapping each other.

The application of current may preferably be sufficient to raise the temperature of the duplex stainless steel pieces at their respective end-faces to at least soften said duplex stainless steel, preferably the application of current being sufficiently low to avoid burning off the duplex stainless steel.

In general the dual upset welding may be according to the prior art combined with the controlled cooling. Apparatus for dual upset welding and information about how to perform the prior art dual upset welding can e.g. be obtained from AUGUST STRECKER GmbH & Co, Limburg, Germany.

In one embodiment the resistance welding is a flash welding.

In one embodiment the flash welding is a resistance welding process which produces coalescence simultaneously over the entire area of abutting surfaces, by the heat obtained from resistance to electric current between the two surfaces, and optionally by the application of pressure after heating is substantially completed.

In this embodiment flashing and upsetting are accompanied by expulsion of duplex stainless steel from the joint. During the welding operation there may be an intense flashing arc and heating of the duplex stainless steel on the surface abutting each other. After a predetermined time the two pieces may be forced together and coalescence occurs at the interface. Current flow is possible because of the light contact between the two parts being flash welded.

The heat is generated by the flashing and is mainly localized in the area between the two parts. The surfaces may be brought to the melting point and expelled through the abutting area. As soon as this material is flashed away, another small arc is formed which preferably continues until the entire abutting surfaces are at the melting temperature. Pressure may then be applied.

In one embodiment the flash welding comprises
bringing said two end faces in contact with each other
heating at least a section of said two duplex stainless steel pieces by applying a current, the heated sections comprising said end-faces, and
optionally applying a pressure to press the end faces together.

The two end faces may be brought in contact prior to applying the current or after having initiated the current.

In one embodiment the application of current and the pressing of the end-faces against each other are performed at least partly overlapping each other.

In one embodiment the application of current is in the form of a relatively high current density, such as at least about 25 $A/mm^2$ surface to be welded, for a relatively short period, such as about 1 second or less, such as about 0.5 seconds or less, such as about 0.1 seconds.

In one embodiment the application of current is sufficiently high to at least burn off a surface layer of at least one of the abutting end-faces.

In general the flash welding may be according to the prior art combined with the controlled cooling. Apparatus for flash welding and information about how to perform the prior art flash welding can e.g. be obtained from IDEAL Werk, Lippstadt, Germany.

The optimal welding temperature depends largely on the method used and the material welded. In one embodiment the welding comprises heating the duplex stainless steel strip at least in said interface section to a temperature of at least about 1100° C., preferably at least about 1200° C., such as at least about 1300° C., such as at least about 1500° C.

The controlled cooling of the welded interface section preferably comprises prolonging the cooling of the interface section preferably at least for the cooling from about 800 to about 600° C., such as from about 1100° C. to about 600° C.

The cooling in the temperature interval from about 1100° C. to about 600° C. has shown to be the most critical cooling interval. In one embodiment the cooling from about 1100° C. to about 600° C. is arranged to be prolonged to at least 2 times, such as at least 3 times, such as at least 4 times, such as at least 5 times the time it would have taken without the controlled cooling.

In a preferred embodiment cooling is provided by applying heat to reduce the cooling rate in at least a part of the cooling of the interface section, the heat may preferably be applied in the form of current to reduce the cooling rate in at least a part of the cooling of the interface section.

By applying heat by applying a current the prolonged cooling may be controlled to a very high degree and furthermore possible variations of temperature within the material in the interface section may be kept at a very low level.

In one embodiment the duplex stainless steel strip is of a duplex comprising an austenite and ferrite mixture in the interval from about 40:60 volume %, to about 60:40 volume %.

An example of a desired duplex stainless steel is described in WO06097112.

In one embodiment the strip is in the form of a wire, such as a wire having a profile selected from round, square, rectangular, X-profiled, K-profiled, I profiled, C-profiles or T-profiled. Examples of such profiles are e.g. described in U.S. Pat. No. 7,032,623,U.S. Pat. No. 6,889,717, U.S. Pat. No. 6,668,867, US 2004/0055657, U.S. Pat. No. 6,840,286, U.S. Pat. No. 6,691,743, WO 01 81809, WO 00 36324, U.S. Pat. No. 6,415,825, U.S. Pat. No. 6,354,333, U.S. Pat. No. 6,253,793, U.S. Pat. No. 5,275,209, U.S. Pat. No. 5,730,188, U.S. Pat. No. 6,192,941, U.S. Pat. No. 5,813,439, U.S. Pat. No. 6,283,161, U.S. Pat. No. 6,065,501 and U.S. Pat. No. 4,549,581.

In one embodiment the strip is in the form of a flat strip having a thickness which is at least 10 times less than its width, such a strip may preferably be used in an inner armouring layer (a carcass), but it may also be used in outer armouring layers e.g. in combination with a profiled wire.

The invention also relates to a method of providing a flexible pipe. This method comprises
 providing an inner liner providing the innermost barrier to a fluid to be transported in the pipe, and
 surrounding said inner liner with at least one outer armouring layer, wherein at least one armouring layer is provided by helically winding at least one duplex stainless steel strip produced as described above.

In one embodiment the welding of the pieces of duplex stainless steel is performed in line with helically winding the produced strip(s).

In one embodiment the welding of the pieces of duplex stainless steel is performed in a separate step prior to winding the produced strip.

For producing an armouring layer one or more strips may be used. The optimal number of strips depends on the type of armouring layer and the desired lay angle of the strip.

In one embodiment the armouring layer provided by the strip(s) comprises at least one outer armouring layer.

In one embodiment the flexible pipe comprises an inner armouring layer (carcass) inside the inner liner, preferably at least this inner armouring layer being provided by the strip(s).

In one embodiment the flexible pipe comprises three or more unbonded layers including an inner layer, surrounded by two or more outer armouring layers, preferably at least one of said outer armouring layers being provided by said duplex stainless steel strip(s).

The invention also relates to an apparatus for welding duplex stainless steel pieces together wherein the duplex stainless steel pieces each comprise an end part with an endface. The apparatus comprises a pair of conductive platens capable of holding the two duplex stainless steel pieces in their respective end parts. The pair of conductive platens is movable relative to each other and are arranged to bring said end faces in contact with each other, and said pair of conductive platens are capable of heating said respective end parts of said duplex stainless steel pieces. The apparatus further comprises a computer programmed to apply current through said conductive platens to heat said end parts to a sufficient level to weld said end-faces together to form an interface section, and allowing said interface section to cool under controlled conditions comprising applying current through said conductive platens during at least a part of the cooling of the interface section.

The computer may be an integrated part of the welding apparatus or it may be an external computer connected to the welding apparatus.

In one embodiment the pair of conductive platens is capable of pressing said end faces together. The computer is programmed to press said end faces together during or after applying current through said conductive platens to heat said end parts to a sufficient level to weld said end-faces together to form the interface section.

In one embodiment the computer is programmed to allow the interface section to cool down to at least about 1300° C., such as at least about 1100° C., without application of additional heat where after the cooling rate is controlled by applying heat, until the temperature of the interface section is about 600° C. or less or even until the temperature is about 300° C. or less.

In one embodiment the apparatus comprises an Infra Red Pyrometer temperature sensor arranged to determine the temperature of an interface section under welding.

FIG. 1 shows a comparable example of producing a duplex stainless steel strip by welding according to prior art having a normal cooling curve without controlled cooling and an example of the invention comprising controlled cooling as shown by the controlled cooling curve.

As it can be seen following the time line the interface section has an initial temperature during the welding where it is at least partly in liquid phase. According to the prior art method the interface section is allowed to cool (or sometimes even subjected to a fast cooling). According to an embodiment of the invention the interface section is allowed to cool to the temperature which may for example be about 900° C. or about 1100° C., where after the cooling rate is controlled so that the cooling is prolonged compared to what it would have been without the controlled cooling in particular in the temperature interval $y_1$-$y_2$, where $y_2$ e.g. may be about 600° C. or about 300° C. The remaining cooling to the temperature of the environment may be without cooling control.

What is claimed is:

1. A method of providing a flat duplex stainless steel strip for an armouring layer of a flexible pipe, said method comprising
providing at least two duplex stainless steel pieces each having an end-face and a thickness which is at least 10 times less than its width,
welding said end-faces of said two pieces of duplex stainless steel together to form a welded interface section using resistance welding,
allowing the welded interface section to cool down from an initial temperature during the welding where it is at least partly in liquid phase to a temperature $y_1$ of at least about 1100° C. without application of additional heat,
whereafter a controlled cooling of said welded interface section is provided by applying heat in the form of current to reduce the cooling rate of the interface section at least for the cooling from about the temperature $y_1$ until the temperature of the interface section is a temperature $y_2$ of about 600° C. or less.

2. A method as claimed in claim 1 wherein the duplex stainless steel pieces is in the form of oblong elements with a substantially identical cross-sectional profile, the method comprising welding the duplex stainless steel pieces to each other in an end-to-end configuration.

3. A method as claimed in claim 1, wherein the resistance welding is a dual upset welding.

4. A method as claimed in claim 3
wherein the dual upset welding comprises
bringing said two end faces in contact with each other
heating at least a section of said two duplex stainless steel pieces by applying a current, the heated sections comprising said end-faces, and
pressing said end-faces against each other.

5. A method as claimed in claim 4, wherein the application of current is sufficient to raise the temperature of the duplex stainless steel pieces at their respective end-faces to at least soften said duplex stainless steel, preferably the application of current being sufficiently low to avoid burning off the duplex stainless steel.

6. A method as claimed in claim 1, wherein the resistance welding is a flash welding, the method comprising
bringing said two end faces in contact with each other
heating at least a section of said two duplex stainless steel pieces by applying a current, the heated sections comprising said end-faces, and
applying a pressure.

7. A method as claimed in claim 6, wherein the application of current is in the form of a current density above about 25 A/mm² surface to be welded, for a period of about 1 second or less.

8. A method as claimed in claim 6 wherein the application of current is sufficiently high to at least burn off a surface layer of at least one of the abutting end-faces.

9. A method as claimed in claim 1, wherein the welding comprises heating the duplex stainless steel strip at least in said interface section to a temperature of at least about 1100° C.

10. A method as claimed in claim 1, wherein the controlled cooling of said welded interface section comprises prolonging the cooling of the interface section at least for the cooling from about 800° C. to about 600° C.

11. A method as claimed in claim 1, wherein the controlled cooling is provided by applying heat to reduce the cooling rate in at least a part of the cooling of the interface section, the controlled cooling is provided by applying heat in the form of current to reduce the cooling rate in at least a part of the cooling of the interface section.

12. A method as claimed in claim 1, wherein the interface section is allowed to cool down to at least about 1200° C. without application of additional heat where after the cooling rate is controlled by applying heat, until the temperature of the interface section is about 600° C. or less.

13. A method as claimed in claim 1, wherein the interface of the temperature of the interface section is measured using Infra Red Pyrometer.

14. A method as claimed in claim 1, wherein the duplex stainless steel strip is of a duplex comprising an austenite and ferrite mixture in the interval from about 40:60 volume %, to about 60:40 volume %.

15. A method as claimed in claim 1, wherein the flexible pipe comprises an inner armouring layer (carcass) inside the inner liner, said inner armouring layer being provided by the duplex stainless steel strip(s).

16. An apparatus for welding flat duplex stainless steel pieces together wherein the duplex stainless steel pieces each comprise an end part with an end-face and a thickness which is at least 10 times less than its width, said apparatus comprises a pair of conductive platens capable of holding the duplex stainless steel pieces in their respective end parts, said pair of conductive platens being movable relative to each other and arranged to bring said end faces in contact with each other, and said pair of conductive platens being capable of heating said respective end parts of said duplex stainless steel pieces, wherein said apparatus further comprises a computer programmed to apply current through said conductive platens to heat said end parts to a sufficient level to weld said end-faces together to form an interface section, and to allow said interface section to cool under controlled conditions by applying current through said conductive platens during at least a part of the cooling of the interface section, such that said welded interface section is allowed to cool down from an initial temperature during the welding where it is at least partly in liquid phase to a temperature $y_2$ of at least about 1100° C. without application of additional heat whereafter the cooling rate is controlled by applying heat in the form of current to reduce the cooling rate at least for the cooling from the temperature $y_2$ until the temperature of the interface section is a temperature $y_2$ of about 600° C. or less.

17. An apparatus as claimed in claim 16 wherein said pair of conductive platens are to press said end faces together, said computer being programmed to press said end faces together during or after applying current through said conductive platens to heat said end parts to a sufficient level to weld said end-faces together to form the interface section.

18. An apparatus as claimed in claim 16, wherein said computer is programmed to allow the interface section to cool down to at least about 1200° C. without application of additional heat where after the cooling rate is controlled by applying heat, until the temperature of the interface section is about 600° C. or less.

19. An apparatus as claimed in claim 16, wherein said apparatus comprises an Infra Red Pyrometer temperature sensor arranged to determine the temperature of an interface section.

* * * * *

UNITED STATES PATENT AND TRADEMARK OFFICE
CERTIFICATE OF CORRECTION

| | |
|---|---|
| PATENT NO. | : 8,350,178 B2 |
| APPLICATION NO. | : 12/532732 |
| DATED | : January 8, 2013 |
| INVENTOR(S) | : Steen Inselmann |

It is certified that error appears in the above-identified patent and that said Letters Patent is hereby corrected as shown below:

In the Claims:

Column 8, line 43, please delete "$Y_2$" and add -- $Y_1$ --

Column 8, line 46, please delete "$Y_2$" and add -- $Y_1$ --

Signed and Sealed this
Ninth Day of July, 2013

Teresa Stanek Rea
*Acting Director of the United States Patent and Trademark Office*